(12) United States Patent
Van Leekwijck et al.

(10) Patent No.: US 8,689,246 B2
(45) Date of Patent: Apr. 1, 2014

(54) METHOD OF PROVIDING AN IPTV SERVICE

(75) Inventors: Werner Van Leekwijck, Antwerp (BE); Toon Coppens, Lier (BE); Ing-Jyh Tsang, Waasmunster (BE); Tim Gyselings, Deurne (BE)

(73) Assignee: Alcatel Lucent, Paris (FR)

( * ) Notice: Subject to any disclaimer, the term of this patent is extended or adjusted under 35 U.S.C. 154(b) by 914 days.

(21) Appl. No.: 11/845,992

(22) Filed: Aug. 28, 2007

(65) Prior Publication Data

US 2008/0060035 A1 Mar. 6, 2008

(30) Foreign Application Priority Data

Sep. 1, 2006 (EP) .................................... 06291400

(51) Int. Cl.
*H04N 21/63* (2011.01)
*H04N 21/647* (2011.01)
*H04N 21/2543* (2011.01)
*H04N 21/6334* (2011.01)

(52) U.S. Cl.
CPC .......... *H04N 21/632* (2013.01); *H04N 21/6334* (2013.01); *H04N 21/64707* (2013.01); *H04N 21/2543* (2013.01)
USPC ........ 725/4; 725/9; 725/25; 725/98; 725/109; 725/127

(58) Field of Classification Search
USPC ......................................................... 725/109
See application file for complete search history.

(56) References Cited

U.S. PATENT DOCUMENTS

| | | | |
|---|---|---|---|
| 6,418,467 B1 * | 7/2002 | Schweitzer et al. | 709/223 |
| 6,973,033 B1 * | 12/2005 | Chiu et al. | 370/230.1 |
| 7,656,873 B2 * | 2/2010 | Li et al. | 370/392 |
| 8,150,966 B2 * | 4/2012 | Gyo et al. | 709/224 |
| 2002/0120872 A1 | 8/2002 | Amada et al. | |
| 2004/0114579 A1 | 6/2004 | Karaoguz et al. | |

(Continued)

FOREIGN PATENT DOCUMENTS

| | | |
|---|---|---|
| EP | 1197928 A1 | 4/2002 |
| EP | 1482687 A2 | 12/2004 |

(Continued)

OTHER PUBLICATIONS

Julie Layton. Howstuffworks: How Slingbox Works. Archived Mar. 16, 2006 (see url with date info). http://web.archive.org/web/20060316191855/http://electronics.howstuffworks.com/slingbox.htm/printable.*

*Primary Examiner* — Bennett Ingvoldstad
(74) *Attorney, Agent, or Firm* — Harness, Dickey & Pierce

(57) ABSTRACT

A method of providing an Internet protocol television service to a subscriber, and a network element to execute this method. At an acquisition tier, IPTV packets are generated from video stream data of one or more video channels and transmitted to a FCC server cluster at a client-facing tier. IPTV packets associated with one of the one or more video channels selected by the subscriber are delivered from the deliver server cluster to a receiver of the subscriber at a client tier wherein the IPTV packets associated with the one of the one or more video channels are reassembled at said receiver into a coherent video stream. Said generated IPTV packets are routed from a network (5) of a TV broadcaster to networks of one or more TV operators or from a network of a TV operator to networks of one or more TV operators by means of IPTV service routers installed at an intertwine tier arranged between the acquisition tier and the client-facing tier.

10 Claims, 5 Drawing Sheets

(56) References Cited

U.S. PATENT DOCUMENTS

2007/0171942 A1* 7/2007 Quinard ................. 370/498
2007/0180145 A1* 8/2007 Scheibe ................. 709/246
2007/0300252 A1* 12/2007 Acharya et al. ........... 725/25

FOREIGN PATENT DOCUMENTS

| WO | WO 2004/068785 A1 | | 8/2004 |
| WO | WO2006116912 | * | 11/2006 |
| WO | WO 2006/131898 A2 | | 12/2006 |

* cited by examiner

METHOD OF PROVIDING AN IPTV SERVICE

BACKGROUND OF THE INVENTION

The invention is based on a priority application EP 06291400.7 which is hereby incorporated by reference.

The present invention relates to a method of providing an Internet protocol television (=IPTV) service to a subscriber, and a network element to execute said method.

Currently, the form of IPTV is designed for a single operator to deliver broadcast TV (=television) within its own network. IPTV solutions can be divided in tiers such as the acquisition tier, the client-facing tier and the client tier.

The acquisition tier is composed of Video Head End Servers (=VHE Servers), which are responsible for capture and encoding audio, video and sideband data. They also package the data in RTP format and transmit over multicast (RTP=Real-Time Transport Protocol). The client-facing tier is where FCC servers are located. The FCC servers are responsible for receiving the multicast data from the VHE-Server for fan-out to clients maintaining buffers per service. These servers are used for fast channel change. The third tier is the client, with the setup box that is responsible for sending signaling commands from the user and to decode the data. In the current solution the three tiers are coupled and provided by a single network operator.

SUMMARY OF THE INVENTION

It is the object of the present invention to provide an enhanced IPTV service.

The object of the present invention is achieved by a method of providing an Internet protocol television service to a subscriber, the method comprising the steps of generating, at an acquisition tier, IPTV packets from video stream data of one or more video channels, transmitting said generated IPTV packets to a FCC server cluster at a client-facing tier, delivering IPTV packets associated with one of the one or more video channels selected by the subscriber from the FCC server cluster to a receiver of the subscriber at a client tier wherein the IPTV packets associated with the one of the one or more video channels selected by the subscriber are reassembled at said receiver into a coherent video stream for display to the subscriber, whereby the method comprises the further step of routing said generated IPTV packets from a network of a TV broadcaster to one or more networks of one or more TV operators or from a network of a TV operator to one or more networks of one or more TV operators by means of IPTV service routers installed at an intertwine tier arranged between the acquisition tier and the client-facing tier, whereby each of the networks of the TV broadcaster and/or TV operators has an IPTV service router associated with it and whereby the IPTV service routers are responsible for signaling and transport of said generated IPTV packets through said intertwine tier. The object of the present invention is further achieved by a network element for supporting the provision of an Internet protocol television service to a subscriber, whereby the network element is an IPTV service router adapted to route IPTV packets, generated at an acquisition tier from video stream data of one or more video channels, from a network of a TV broadcaster to one or more networks of one or more TV operators or from a network of a TV operator to one or more networks of one or more TV operators, for transmission of said generated IPTV packets to a FCC server cluster at a client-facing tier and delivery of IPTV packets associated with one of the one or more video channels selected by the subscriber from the FCC server cluster to a receiver of the subscriber at a client tier wherein the IPTV packets associated with the one of the one or more video channels selected by the subscriber are reassembled at said receiver into a coherent video stream for display to the subscriber, and that the network element is responsible for signaling and transport of said generated IPTV packets through an intertwine tier arranged between the acquisition tier and the client-facing tier, whereby the network element is associated with one of the networks of the TV broadcaster and/or TV operators.

Said video stream data may be TV channel data and video data, e.g., from a VoD service. When speaking of TV channels or TV data in this document, these terms both comprise live TV data and video data.

Each network involved in the IPTV service has at least one network element, i.e., an IPTV-SR associated with it which is responsible for signaling and transport of said generated IPTV packets through the intertwine tier and which interacts with one or more IPTV service routers installed at the intertwine tier associated with another one of the networks.

The present invention is to add an additional tier, between the acquisition tier and the client facing tier: the intertwine tier, responsible for the signaling and transport of the IPTV packets from the TV broadcast network or from a TV operator network to another TV operator network. This intertwine tier comprises a network element, namely an IPTV Service Router, or embeds respective functionalities in an already existing network element, e.g., an already existing service router of the network, which would interlink the TV broadcast VoD, and VHE servers with the servers used for FCC at the operator side.

The IPTV Service Router (=IPTV-SR) is responsible for all the signaling and data transport to enable the IPTV data packet originating from the TV broadcast network be correctly and efficiently transported to the IPTV-SR at the TV operator side. Authentication, security and bandwidth allocation are also handled by this network element, in such a way that it allows a truly global IPTV system. It can be seeing as having the functions of a gateway, i.e. enabling IPTV services from one operator to another. And functions of a Session Board Controller (SBS), which would exert control over the signaling and media streams involved in setting up, conducting, and tearing down the IPTV session.

In addition the IPTV-SR is responsible for all the signaling, authentication, security and accounting in between IPTV-SR of different operator, so to enable IPTV roaming.

The major advantage this invention introduces is twofold. First, due to the fact that each client facing tier and corresponding client tier can be coupled to a different acquisition tier the invention allows a truly global IPTV system, i.e. delivery of a TV broadcast from a TV broadcast network to any TV operator network in any location in the world. Second, this invention proposes a network element (=NE) capable of delivering global IPTV with roaming capabilities. IPTV roaming refers to the capability of an IPTV service to allow a subscriber to receive IPTV packets when being a registered client of a TV operator network other than the TV operator network he is originally subscribed to. A global IPTV system refers to a network delivery system, capable of transmitting real-time IPTV broadcast, not only within the same TV operator network, but also cross-network implying or not cross-geographical transmission. Viewers are enabled to watch their TV subscription in any part of the world independently of the TV operator network they are subscribed to.

Consequently, such system allows an innovative business model for TV broadcast, i.e. the split of a TV subscription between the TV broadcast network and the TV operator network. Thus, instead of having to pay a local TV network operator for a package with access to a lot of channels that a viewer might not be interested at all, he/she can just buy the subscription directly at a TV broadcast network (for example BBC) and pay the TV network operator for the capability to receive the channel. This does not pose a threat to the TV network operator, since they are paid for the delivery of the channels. In addition, the TV network operators could charge "roaming" when a TV channel is originated outside their network. For the TV broadcasters this could generate more revenue since they would have a global audience of subscribers.

For the viewer this could be appealing, because they could choose which specific channel they subscribe, in addition to being able to subscribe and receive channels from other countries. Such interest would not be just limited to watch real-time live shows or events, but also to watch shows, which are produced by TV channels and usually take time to be broadcast in the local TV network or even are never broadcast locally.

Further advantages are achieved by the embodiments of the invention indicated by the dependent claims.

According to a preferred embodiment of the invention, the subscriber can roam from his home TV operator network to another TV operator network and still receive the TV channels he is subscribed to. That means that the present invention adds roaming functionality to the IPTV service. A truly global IPTV system refers to the capability of delivering TV data, e.g., live TV, from/to any location in the world.

Initially, the subscriber signs a contract with a TV operator before the subscriber can receive IPTV packets. By virtue of this contract, the TV operator is obliged to deliver IPTV packets provided by a TV broadcast network via the network of the TV operator to the subscriber's client device, e.g., the subscriber's set-top box. When the subscriber leaves the reach of his original TV operator network and has roamed within the reach of another TV operator network, the subscriber can log on to this other another TV operator network, let us call it "roaming TV operator network", and request a roaming service.

The roaming service provides a subscriber with the capability to receive his subscribed TV channels although the subscriber is not logged to his original TV operator network. The subscriber's roaming service request will be forwarded to a verification entity for examining the subscriber's authorization to access the roaming service. For example, a control entity of the roaming TV operator network sends the roaming request to a control entity of the original TV operator network where the subscriber's rights are checked. If the subscriber is not authorized for the roaming service, the subscriber will be informed about a stop of the roaming service. Otherwise, two alternatives exist.

According to the first alternative, the roaming TV operator network can trigger the IPTV service router associated with the original TV operator network to send the subscriber's TV channel data to the IPTV service router associated with the roaming TV operator network. From there, the IPTV service is executed as usual. According to the second alternative, the roaming TV operator network can trigger the IPTV service router associated with the TV broadcast network to send the subscriber's TV channel data directly to the IPTV service router associated with the roaming TV operator network. From there, the IPTV service is executed as usual.

According to another preferred embodiment of the invention, one or more IPTV-SRs collect data related to an IPTV roaming service event. For example, an IPTV-SR which is located in the path of the IPTV packets forwarded to the roaming subscriber gathers information about the roaming TV operator network and other involved networks, the begin, end, and duration of the roaming event, the bandwidth occupied by the roaming event, etc. The collected data may be stored and used later on to charge the roaming subscriber for the provision of the IPTV roaming service.

According to another preferred embodiment of the invention, the IPTV-SRs gather information about the topology of one or more of the associated networks. Roaming events of a subscriber as well as new subscriptions and other changes in the set-up of the IPTV service network are collected and stored in one or more routing databases. The one or more routing databases may be maintained by one or more of the IPTV-SRs. Changes that have to be done to the one or more databases are executed in a dynamic manner, i.e., by continuously updating the database during the operation of the database. For example, when an IPTV-SR needs to react to an IPTV roaming request, the IPTV-SR retrieves information, e.g., about the latest location of a subscriber, from the database.

In a preferred embodiment, before a subscriber is allowed to use an IPTV service, the subscriber's right to use the IPTV service is verified. A subscriber's request for a roaming service or a request for receiving a specific TV channel may be checked at an IPTV-SR, preferably by a verification unit of the IPTV-SR, for the validity of the respective request. Each subscriber is only allowed to those IPTV services, which he has subscribed to. In another embodiment, the IPTV-SR receiving a roaming request does not itself check the roaming subscriber's authentication but forwards this task to a suitable entity in the subscriber's home network, i.e., the network where the subscriber is originally subscribed to. In the subscriber's home network, checking the subscriber's rights for roaming, subscription and other IPTV services can be executed by looking up a relevant database, e.g., a HLR (=home location register).

According to another preferred embodiment of the invention, the IPTV-SR associated with a TV broadcast network or a TV operator network is able to prioritize the transmission of IPTV packets over one or more of said networks. The IPTV-SR comprises a control unit, which allocates bandwidth of one or more of said networks to IPTV packets associated with a TV channel. The subscriber may choose to subscribe to a specific level of QoS with regard to a subscribed TV channel. The IPTV packets associated with the subscribed TV channel will be handled according to the subscribed level of QoS. As the IPTV-SR represents the link between the different networks, the IPTV-SR is predestinated to assure a consistent QoS for IPTV packets associated to a subscribed TV channel in the different networks. The IPTV-SR sending an IPTV packet to another IPTV-SR signals to the other IPTV-SR the QoS associated with the sent IPTV packet and requests to allocate the corresponding bandwidth to the IPTV packet. Thus, the QoS treatment of an IPTV packet is made equal in all networks transmitting the IPTV packet.

Preferably, the IPTV-SR—associated with a network—provides the functionality of a protecting border element of the network. Before sending an IPTV packet from a network to another network through a insecure communication network, e.g., the public Internet, the IPTV-SR encodes the IPTV packet so that an unauthorized user is not able to view the content of the IPTV packet. It is also possible that the IPTV-SR—in analogy to a Session Border Controller—protects the network it is associated with from unauthorized access, e.g., by mapping IP address information in a NAT-like procedure. Thus, the IPTV-SR hides the topology of the associated network from a third party and provides a security service.

Preferably, the IPTV-SR is associated with a network, e.g., a TV broadcast network or an original TV operator network, from which the IPTV packet is sent to another IPTV-SR associated with another network, e.g., an original TV operator network or a roaming TV operator network. The information which other IPTV-SRs must receive the IPTV packets is defined and determined by the subscribers subscriptions and may be retrieved by the sending/routing IPTV-SR from a routing database. The sending IPTV-SR routes the IPTV-SR, preferably across a third party communication network, to the receiving IPTV-SR. For this purpose, the sending IPTV-SR comprises an interface for sending the IPTV packets and has access to a routing database where routing information related to a subscribed TV channel is kept. Therefore, as said before, the reception IPTV-SRs are pre-defined.

Likewise, the IPTV-SR is associated with a network, e.g., a TV operator network, where the IPTV packet is received from another IPTV-SR associated with another network, e.g., another TV operator network. The IPTV-SR receives the IPTV-SR, preferably from a third party communication network. For this purpose, the receiving IPTV-SR comprises an interface for receiving the IPTV packets. The information which other IPTV-SRs must receive the IPTV packets is defined and determined by the subscribers subscriptions and may be retrieved by the sending/routing IPTV-SR from a routing database. Therefore, as said before, the reception IPTV-SRs are pre-defined.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF THE DRAWINGS

Figure 1:
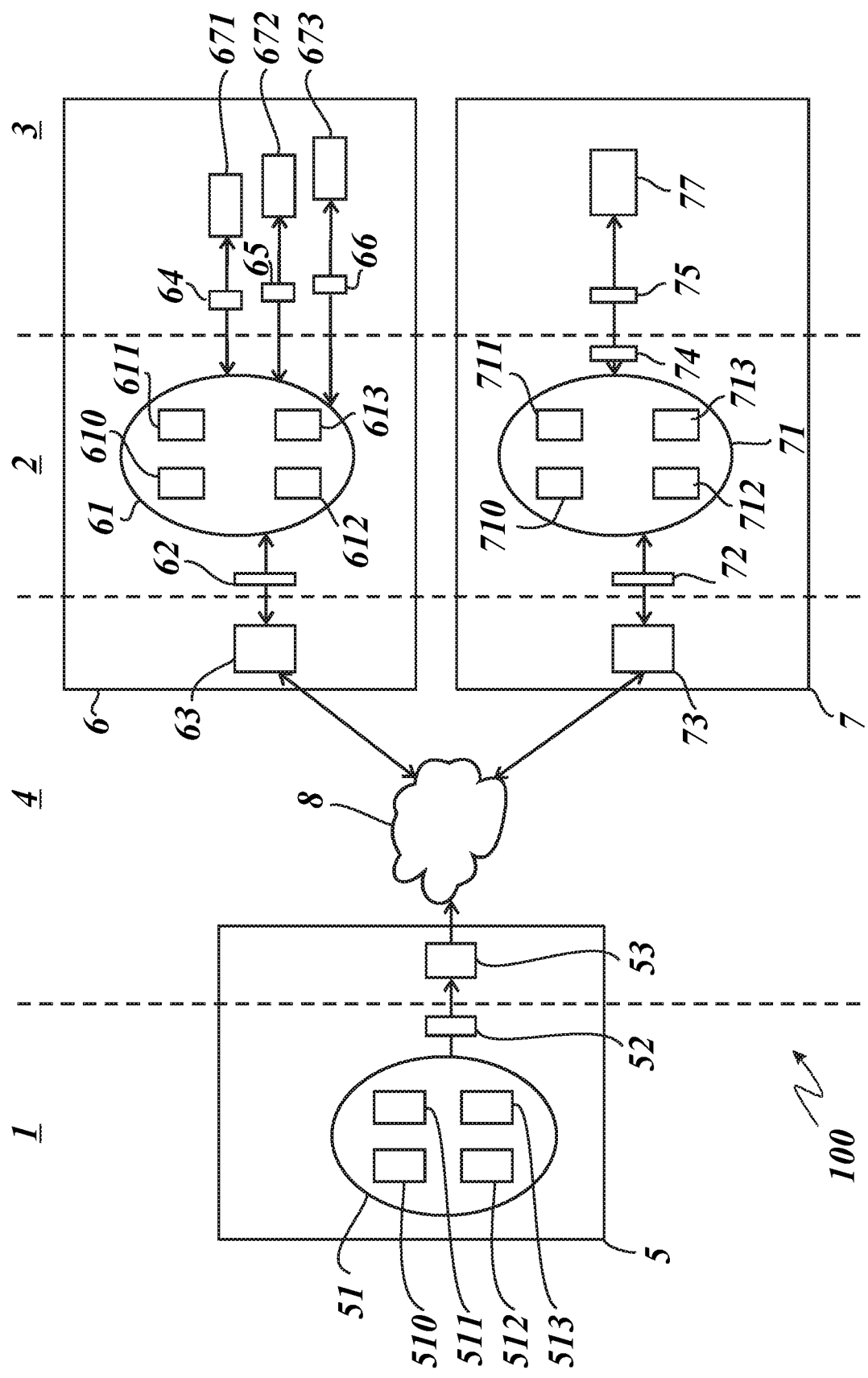
FIG. 1 is a block diagram of an IPTV system according to an embodiment of the invention.

FIG. 1 shows an IPTV service system 100 for the provision of IPTV service comprising three different networks, a TV broadcast network 5, a TV operator network 6 of a first operator, and a TV operator network 7 of another operator. The TV broadcast network 5 comprises a TV broadcast VHE/VoD cluster 51 with acquisition servers 510 to 513 for the acquisition and/or storage of IPTV packets. The acquisition servers 510 to 513 are responsible for capturing/storing and encoding audio, video and sideband data. The acquisition servers 510 to 513 also package the data in RTP format and prepare them for transmission over multicast.

The TV broadcast network 5 may be a network of a TV broadcaster providing IPTV packets or a network comprising a headend where broadcast TV data, e.g., analogue TV signals, are pulled, e.g., from satellites and encoded in IP formats such as, e.g., MPEG-2, MPEG-4, H.264 or VC-1 (MPEG=Motion Picture Experts Group). Said headend may be a control center of a cable TV system, where incoming signals are amplified, converted, processed, and combined into a common cable for transmission to customers. The headend usually includes antennas, preamplifiers, frequency converters, demodulators, modulators, processors, and other related equipment. In another embodiment, the TV broadcast network 5 may be a video library storing VoD data in a packet format and sending video data, e.g., associated with a video requested by a client to said client (VoD=Video on Demand).

The term TV does not exclusively refer to a TV system but may also refer to a video system. The use of the term TV according to the invention refers to any video data (live TV, TV on Demand, VoD, etc.), which are displayed at another location than where they were created.

The TV broadcast network 5 further comprises a firewall 52 and an IPTV service router 53. The firewall provides security, e.g., by limiting the throughput of packets to authorized packets.

The IPTV service system 100 further comprises a first TV operator network 6 and a second TV operator network 7. The TV operator networks 6, 7 may be IP-enabled communication networks, e.g., telecommunication networks or dedicated IPTV networks. For example, the TV operator networks 6, 7 may be different TV operator networks in the same country or region. It is also possible that the first TV operator network 6 may provide a communication service in another country than the second TV operator network 7.

The first TV operator network 6 comprises a FCC server cluster 61 with FCC servers 610 to 613 (in some cases the FFC server cluster may not be present), a firewall 62 and an IPTV service router 63. Client devices 671 to 673 used by subscribers of the IPTV service are coupled to the deliver server cluster 61 via firewalls 64 to 66. A client device may be, e.g., a set-top box and TV or monitor, e.g., a computer monitor of a computer equipped with the software for deploying TV and/or video data.

The deliver servers 610 to 613 receive the IPTV data created and/or provided by the VHE/VoD cluster 51. The deliver servers 610 to 613 provide each of the client devices 671 to 673 with the IPTV data associated with an IPTV channel subscribed by the subscribers utilizing the client devices 671 to 673.

Preferably, the VHE/VoD cluster 51 provides IPTV packets associated with a plurality of different TV channels. These IPTV packets are sent via the communication network 8 to the TV operator network 6 and received by the deliver servers 610 to 613. The subscriber of client device 671 is provided, from the deliver server cluster 61, with the IPTV packets of only that TV channel which the subscriber has subscribed to. Likewise, the subscribers of client devices 672, 673 are provided with IPTV packets of their respective subscribed TV channels. If a subscriber wishes to change from a first TV channel to a second TV channel, he signals his choice of the second TV channel, e.g., by means of a remote control to a set-top box comprised within the client device 671 which sends a request to the deliver server cluster 61, the request triggering the FCC server cluster 61 to deliver IPTV packets of the second TV channel to the client device 671.

The second TV operator network 7 comprises a FCC server cluster 71 with FCC servers 710 to 713, a firewall 72 and an IPTV service router 73. A client device 77 used by a subscriber of the IPTV service is coupled to the FCC server cluster 71 via firewalls 74 and 75. The deliver servers 710 to 713 receive the IPTV data created and/or provided by the VHE/VoD cluster 51 and provide the client device 77 with the IPTV data associated with an IPTV channel subscribed by the subscriber utilizing the client device 77. The delivery of IPTV packets in the TV operator network 7 is done in analogy to the delivery of IPTV packets in the first TV operator network 6 described above.

The IPTV service system 100 further comprises a communication network 8 suitable for the transport of packet-based data. The communication network 8 may be, e.g., the Internet or a telephone network adapted for packet transport. The communication network 8 may comprise two or more networks of different network providers. The communication network 8 provides a communication connection between the TV broadcast network 5 and the TV operator networks 6, 7. However, it is also possible that the TV operator networks 6, 7 are directly coupled to the TV broadcast network 5 without the need of the communication network 8.

FIG. 1 shows the proposed network elements 53, 63, 73 and an overview of the several tiers 1 to 4, with the respective network elements 53, 63, 73, needed for a global IPTV with roaming capabilities. In the present invention, there are four tiers 1 to 4 in the proposed system. While the acquisition, client-facing and client tiers are the same as described in prior art, the invention proposes the addition of the intertwine tier 4, which will be composed of the IPTV-SR. This intertwine tier 4 is responsible for the signaling and transport of the IPTV packets from the TV broadcast network or from a TV operator network to another TV operator network.

From a functional point of view, the IPTV service system 100 is divided into four different tiers 1 to 4. The part of the TV broadcast network 5 comprising the TV broadcast VHE/VoD cluster 51 represents an acquisition tier 1. The parts of the TV operator networks 6, 7 comprising the FCC server clusters 61, 71 represent a client-facing tier 2, and the parts of the TV operator networks 6, 7 comprising the client devices 671 to 673 and 77 represent a client tier 3. According to the present invention, the network system is distinguished from state-of-the-art network systems by the existence of the fourth tier, the intertwine tier 4.

The intertwine tier 4 comprises the IPTV service routers 53, 63 and 73 and the communication network 8 which provides the interconnecting infrastructure of the networks 5, 6 and 7. The IPTV service routers 53, 63 and 73 enable the network system to provide an IPTV service between the different networks 5, 6 and 7, whereby the networks 5, 6 and 7 may be locally and/or administratively separated. The networks 5, 6 and 7 may be installed in different countries and/or may belong to different operators. For example, the TV broadcast network 5 may be a TV broadcast network of country A, the TV operator network 6 may be a TV operator network of operator A in country B and the TV operator network 7 may be a TV operator network of operator B in country C.

For example, imagine that a viewer in Belgium has a Belgium TV broadcast network subscription. By means of the IPTV roaming service, the viewer would be able to watch the channels anywhere he/she goes. For example, when the viewer travels to the US, he/she could watch the Belgium channels there. In the same way as roaming enables that the mobility works within Belgium, IPTV roaming would enable the viewer to watch the Belgium TV subscription in the US. Furthermore, another interesting scenario would be the opposite situation, the viewer could be able to subscribe to a TV broadcast network in the US and watch the American channels in Belgium.

The IPTV service system 100 shown in FIG. 1 allows the separation of an IPTV system in a TV broadcast network 5 where IPTV packets are provided and one or more TV operator networks 6, 7 providing subscribers with access to the IPTV service. The subscribers utilizing the client devices 671 to 673 has subscribed to the TV operator network 6 whereas the subscriber utilizing the client device 77 has subscribed to the TV operator network 7 which is independent of the TV operator network 6. Both TV operator networks 6 and 7 receive TV broadcast data from the TV broadcast network 5, which is operated independently of the TV operator networks 6 and 7.

In case the IPTV-SRs 53, 63, 73 interlink the TV broadcast network 5 and the TV operator networks 6, 7, they may be responsible for authentication, security, bandwidth allocation, and correctly routing the IPTV packets, through a metro and/or a core network 8, such to fulfill the QoS needed for a live TV broadcast (QoS=Quality of Service).

Figure 2:
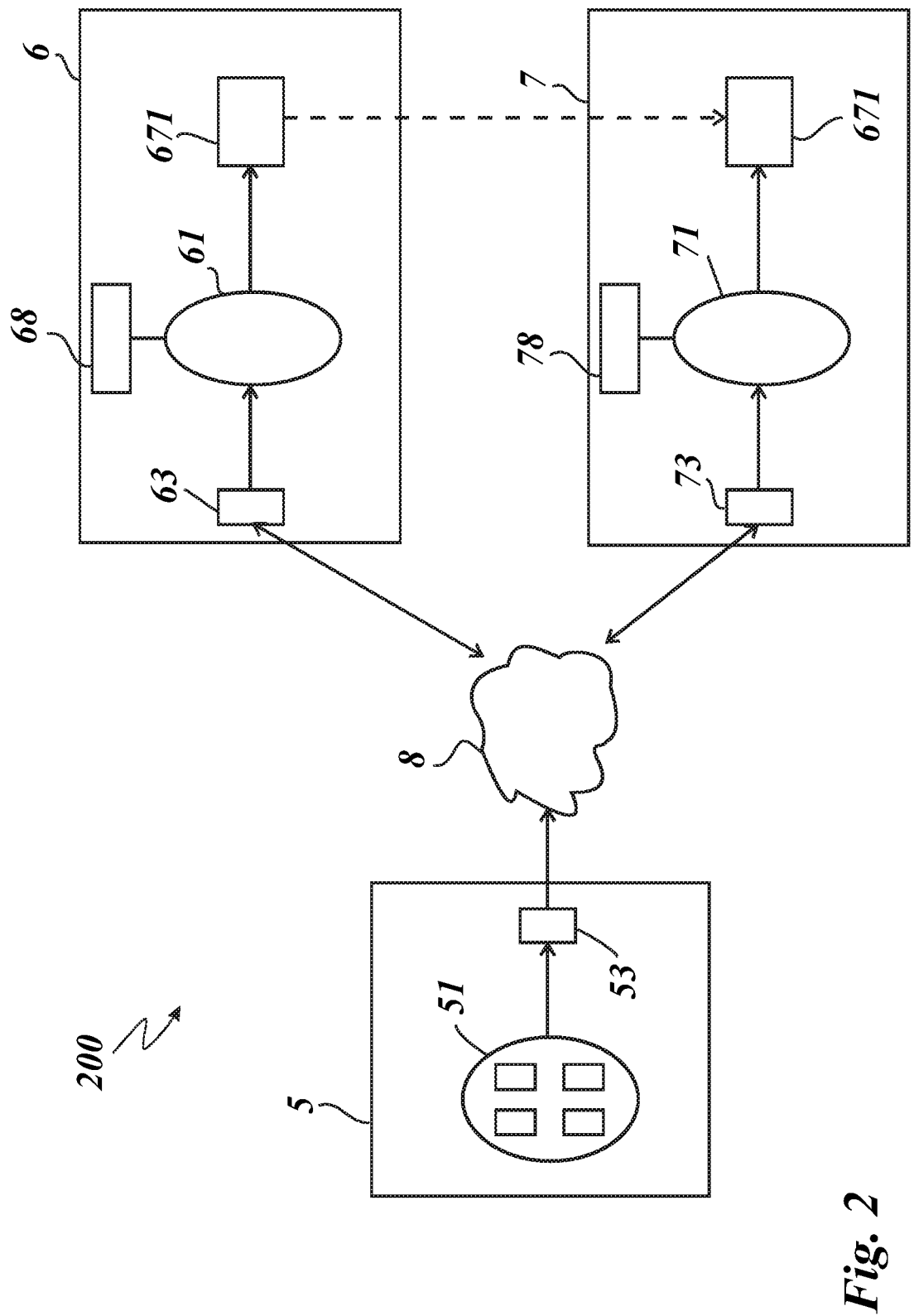
FIG. 2 is a block diagram of an IPTV system with a roaming subscriber according to another embodiment of the invention.

FIG. 2 shows an IPTV service system 200, which is analogous to the IPTV service system shown in FIG. 1. IPTV packets are acquired at an acquisition server cluster 51 of a TV broadcast network 5, and injected by an IPTV-SR associated with the TV broadcast network 5 to a communication network 8. The IPTV packets are routed to other IPTV-SRs 63 and 73, respectively, which are associated with a first TV operator network 6 and a second TV operator network 7, respectively. The first TV operator network 6 further comprises a FCC server cluster 61 and a control unit 68, and provides the client device 671 of a subscriber with access to the IPTV service.

The subscriber utilizing the client device 671 is currently logged in at the first TV operator network 6 where he receives video data generated from IPTV packets originating from the TV broadcast network 5. As shown in FIG. 2, the subscriber utilizing the client device 671 roams to the second TV operator network 7, which we will call roaming TV operator network 7 for that reason. Logged in at the roaming TV operator network 7, the subscriber utilizing the client device 671 wants to receive the same TV channels as when he was logged in at the first TV operator network 6, which may be called home TV operator network 6. The roaming TV operator network 7 comprises an IPTV-SR 73, a FCC server cluster 71 and a control unit 78, and is adapted to provide a logged in client device with access to the IPTV service.

In case the IPTV-SRs 53, 63, 73 interlink two TV operator networks 6 and 7, a "roaming" accounting system may be in place, so that the roaming operator can correctly charge the roaming client. Different scenarios on how the IPTV packet may be routed can be foreseen here. For example, when a roaming client requests a channel, the IPTV-SR of the roaming operator can contact the clients' original operator, process all the signaling function needed for the roaming operator to access the IPTV packets directly from the TV broadcaster. Alternatively, the roaming operator could receive the IPTV packets from the original operator.

Figure 3A:
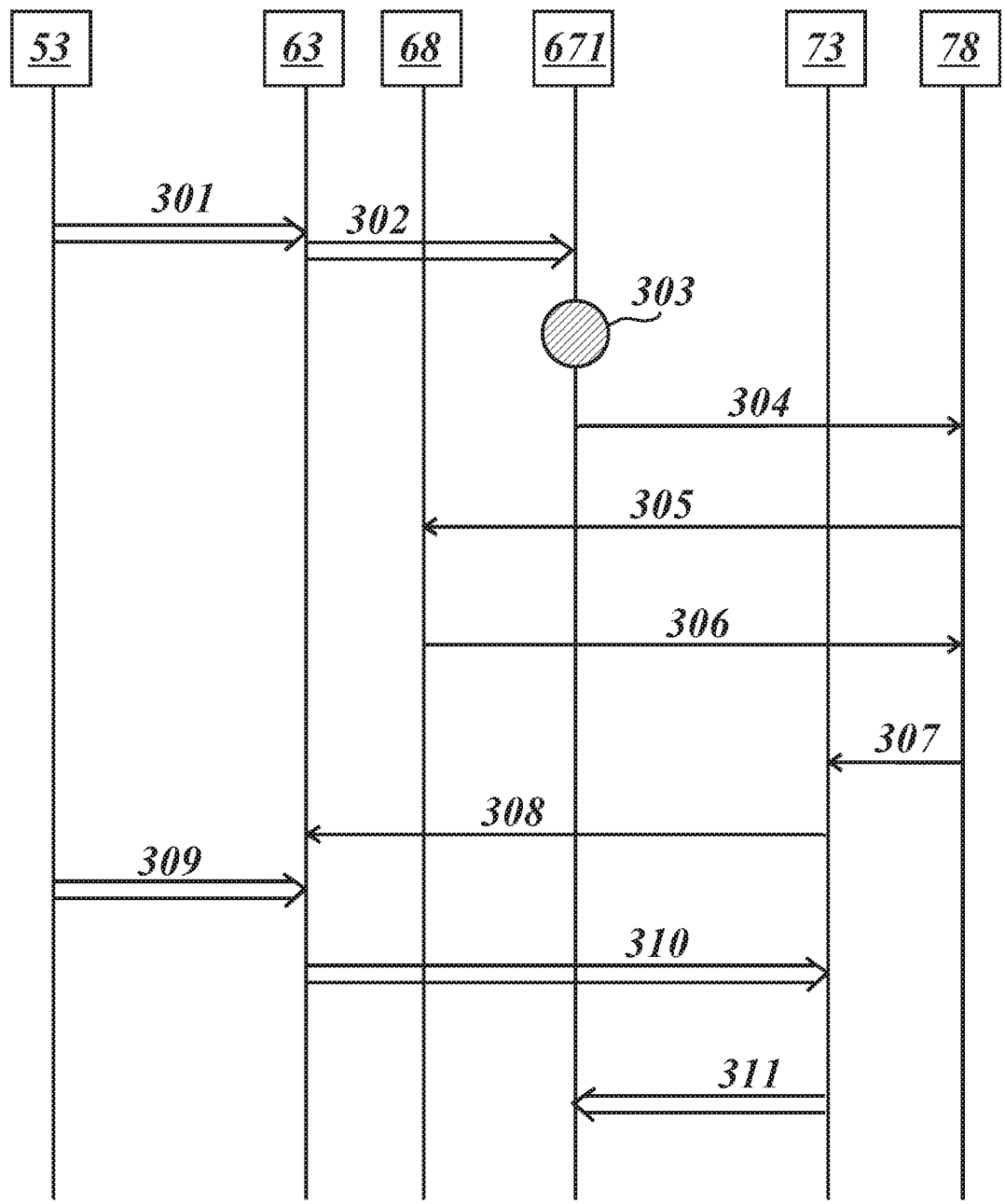
FIG. 3a is a message sequence chart of a first roaming process according to another embodiment of the invention.

FIG. 3a gives a message sequence chart corresponding to a first roaming alternative when handling the roaming event shown in FIG. 2. The message sequence chart involves the IPTV-SR 53 associated with the TV broadcast network 5, the IPTV-SR 63 associated with the TV operator network 6, the control unit 68 of the TV operator network 6, the client device 671 of the roaming subscriber, the IPTV-SR 73 associated with the TV operator network 7, and the control unit 78 of the TV operator network 7.

Data flows are given as double-lined arrows, signaling flows are given as single-lined arrows.

The message sequence chart starts with the state when IPTV packets carrying the data content of a TV channel subscribed by the subscriber are transported as data flow 301 from the IPTV-SR 53 associated with the TV broadcast network 5 to the IPTV-SR 63 associated with the TV operator network 6. From there, the IPTV packets are forwarded as data flow 302 to the client device 671 of the subscriber.

Step 303 indicates the roaming event when the client device 671 is logged off at the home TV operator network 6 and logged in at the roaming TV operator network 7. The subscriber utilizing the client device 671 wants to receive the same TV channel at the roaming TV operator network 7 as he used to at his home TV operator network 6.

When the client device 671 is switched on at the roaming TV operator network 7, it will process a default log-in procedure and search for an available network. It sends a log-in request 304 to the next available suitable network element, i.e., the control unit 78 of the roaming TV operator network 7. As the client device 671 is not yet registered at the roaming TV operator network 7, the control unit 78 sends a verification request 305 to the control unit 68 of the home TV operator network 6 where the client device 671 is originally registered.

The control unit 68 verifies that the roaming client device 671 is registered at the home TV operator network 6 and that the subscriber has the authorization for roaming. This information is sent as message 306 from the control unit 68 of the subscriber's home TV operator network 6 to the control unit 78 of the subscriber's roaming TV operator network 7. The control unit 78 of the subscriber's roaming TV operator network 7 informs the IPTV-SR 73 associated with the roaming TV operator network 7 that the subscriber wants an IPTV roaming service.

The IPTV-SR 73 of the subscriber's roaming TV operator network 7 sends a roaming request message 308 to the IPTV-SR 63 of the subscriber's home TV operator network 6 which triggers the IPTV-SR 63 of the subscriber's home TV operator network 6 to forward the IPTV packets 309 received from the TV broadcast network 5 as a data flow 310 to the IPTV-SR 73 of the subscriber's roaming TV operator network 7. From there, the IPTV-SR 73 of the subscriber's roaming TV operator network 7 forwards the IPTV packets to the client device 671 of the roaming subscriber.

The IPTV-SR 63 of the subscriber's home TV operator network 6 logs the events related to the roaming event, e.g., the time the first IPTV packet was forwarded from the IPTV-SR 63 of the subscriber's home TV operator network 6 to the IPTV-SR 73 of the subscriber's roaming TV operator network 7, the time this forwarding was ended, the volume of forwarded IPTV packets, and so on. That logged data are used to charge the subscriber for the requested roaming service.

Figure 3B:
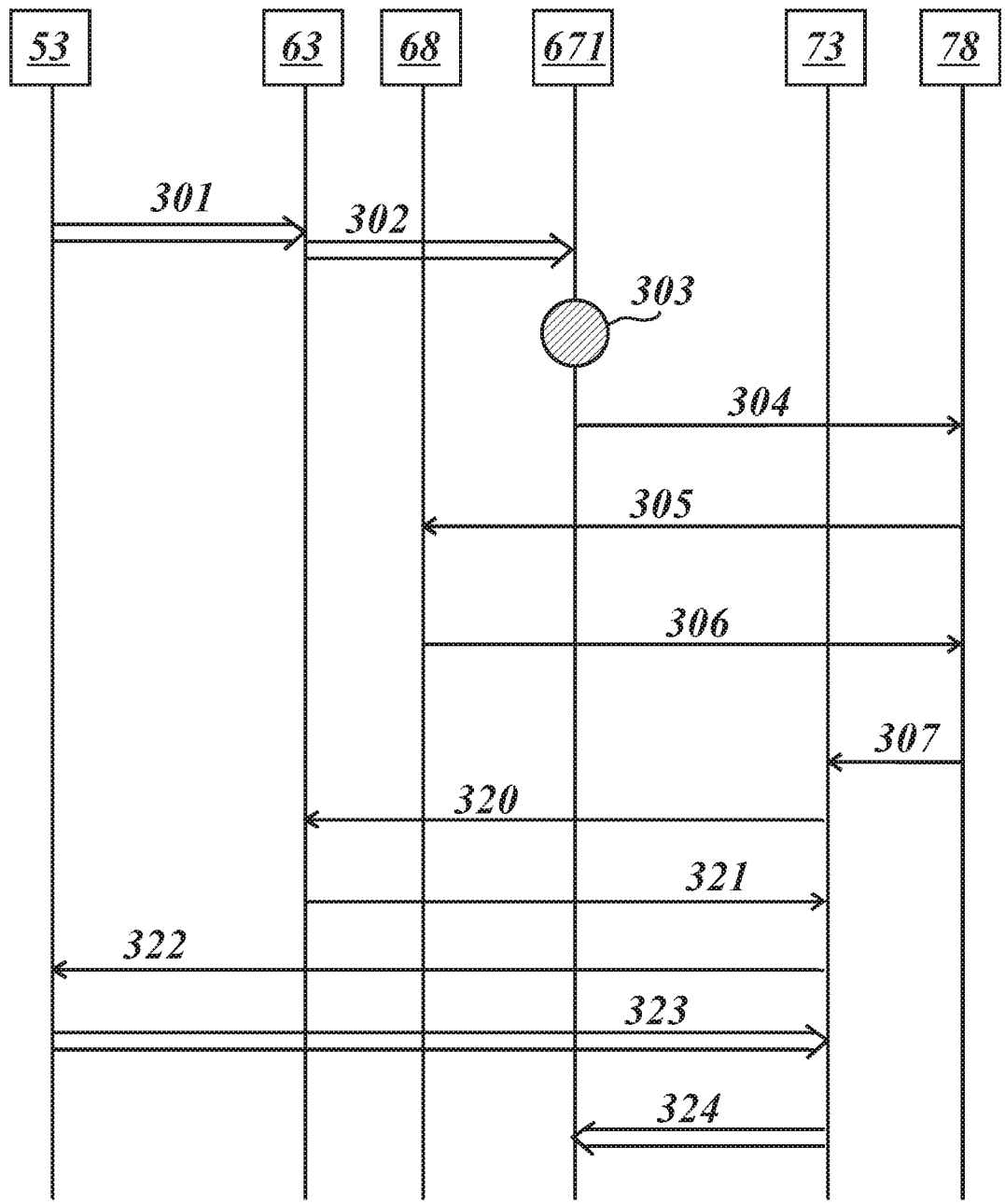
FIG. 3b is a message sequence chart of an alternative roaming process according to another embodiment of the invention.

FIG. 3b gives a message sequence chart corresponding to a second roaming alternative when handling the roaming event shown in FIG. 2. The message sequence chart involves the same elements as in FIG. 3a. As in FIG. 3a, data flows are given as double-lined arrows, signaling flows are given as single-lined arrows.

The steps 301 to 307 are identical to the steps 301 to 307 of FIG. 3b. It is only from step 320 on that there is an alternative treatment of the IPTV roaming request of the subscriber. In step 320, the IPTV-SR 73 of the subscriber's roaming TV operator network 7 sends a request to the IPTV-SR 63 of the subscriber's home TV operator network 6 with which it asks for pieces of data, e.g., network addresses, credentials like a password, etc., needed for directly accessing the IPTV-SR 53 of the TV broadcast network 5.

The IPTV service system must be secured against unauthorized access or manipulation. Therefore, the IPTV-SRs 53, 63, 73 cannot be controlled by any signaling commands. Instead, in order to access the IPTV-SRs 53, 63, 73, a key is required which indicates that the accessing entity possesses an authorization to do so. For example, the IPTV-SR 53 of the TV broadcast network 5 requires a requesting entity to present a password before it allows the requesting entity to instruct the IPTV-SR 53. When the subscriber has subscribed to the TV broadcast network 5 and the home TV operator network 6, a verification scheme regarding the associated IPTV-SRs 53 and 63 has been installed. At the same time, the IPTV-SRs play a role as network border elements and therefore provide a security of their associated networks.

The IPTV-SR 73 of the subscriber's roaming TV operator network 7 receives the requested access data from the IPTV-SR 63 of the subscriber's home TV operator network 6 in a message 321. Then, the IPTV-SR 73 of the subscriber's roaming TV operator network 7 accesses the IPTV-SR 53 of the TV broadcast network 5, verifies itself by means of the received access data, and triggers the IPTV-SR 53 of the TV broadcast network 5 to switch the sending of the IPTV packets from the IPTV-SR 63 of the subscriber's home TV operator network 6 of the IPTV-SR 73 of the subscriber's roaming TV operator network 7. Thus, the IPTV packets are not send to the subscriber's client device 671—as shown in the first roaming alternative of FIG. 3a—via the subscriber's home TV operator network 6 but directly 323 from the IPTV-SR 53 of the TV broadcast network 5 to the IPTV-SR 73 of the subscriber's roaming TV operator network 7. From there, the IPTV packets are forwarded 324 to the subscriber's client device 671.

To respond to the changed network topology, the IPTV-SR 53 of the TV broadcast network 5 will update its routing database. It is obvious that keeping the actual routing instructions is especially useful if a high number of different—potentially roaming—subscribers have to be provided with different TV channel data.

According to a preferred embodiment, the subscriber may have subscribed to a TV news channel and a TV music channel. He may allocate a higher importance to the TV news channel than to the TV music channel and accordingly subscribes a higher QoS for the TV news channel than for the TV music channel, whereby a higher QoS involves a higher subscription fee. The IPTV-SRs involved in the transmission of the subscribed TV channel data correspondingly provide the IPTV packets with a QoS, which suits the pre-defined QoS level.

Figure 4:
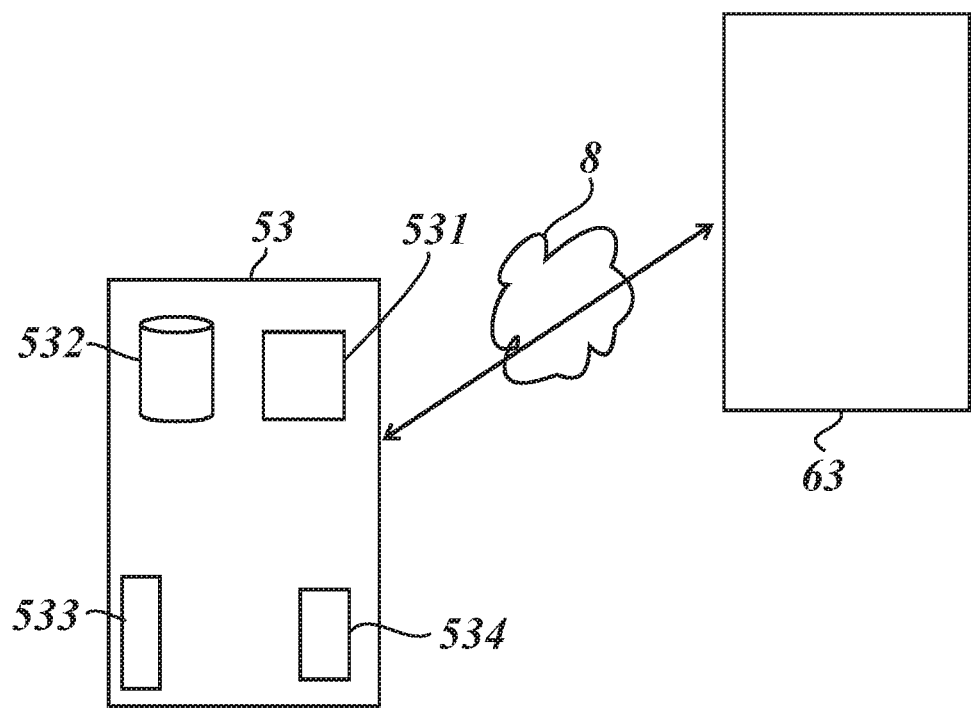
FIG. 4 is a block diagram of an IPTV Service Router according to an embodiment of the invention.

FIG. 4 gives an overview over the basic elements of an exemplary network element 53, which is in contact with another network element 63, via the communication network 8. The network element 53 comprises a control unit 531 for processing the signaling traffic for controlling the IPTV data traffic. The network element 53 further comprises a memory unit 532 for storing data such as routing data, network topologies, passwords, etc. Data exchange with other elements of the IPTV service system is done via an interface 533. Other functions such as monitoring of roaming events may be executed by the control unit 531 or by specific task units. For example, the network element 53 shown in FIG. 4 further comprises a QoS unit 534 which signals to other network elements, e.g., the IPTV-SR 63, a QoS treatment required for IPTV packets of a specific subscription.

The invention claimed is:

1. A method of providing an Internet protocol television service to a subscriber, the method comprising:
  generating, at an acquisition tier, IPTV packets from video stream data of one or more video channels, the acquisition tier including at least one TV broadcaster;
  transmitting said generated IPTV packets to a FCC server cluster at a client-facing tier, the client-facing tier including one or more TV operators;
  delivering IPTV packets associated with one of the one or more video channels selected by the subscriber from the FCC server cluster to a receiver of the subscriber at a client tier wherein the IPTV packets associated with the one of the one or more video channels selected by the subscriber are reassembled at said receiver into a coherent video stream for display to the subscriber;

routing said generated IPTV packets from a network of the at least one TV operator to one or more networks of the one or more TV operators using IPTV service routers installed at an intertwine tier arranged between the acquisition tier and the client-facing tier, each of the networks of the TV broadcaster and TV operators having an associated IPTV service router and the IPTV service routers signaling and transporting said generated IPTV packets through said intertwine tier;

determining, by one or more of the IPTV service routers engaged in a roaming service of the subscriber roaming from a network of a first TV operator to which the subscriber is originally subscribed to a roaming network of a second TV operator, data related to the roaming service; and charging the roaming subscriber for the roaming service on the basis of the determined data.

2. The method of claim 1, further comprising:

logging in, by the subscriber roaming from the network of the first TV operator to which the subscriber is originally subscribed to the roaming network of the second TV operator, at the roaming network of the second TV operator and requesting the roaming service; and triggering, if the subscriber is authorized for the roaming service, the IPTV service router associated with the network of the first TV operator to forward the IPTV packets to the IPTV service router associated with the roaming network of the second TV operator or triggering the IPTV service router associated with the network of the TV broadcaster to directly send the IPTV packets to the IPTV service router associated with the roaming network of the second TV operator.

3. The method of claim 1, further comprising:

maintaining, by one or more of said IPTV service routers, a routing database with data for correctly routing IPTV packets to the subscriber; and dynamically adapting said routing database to topological changes of one or more of said networks.

4. The method of claim 1, further comprising:

examining, by one or more of said IPTV service routers, an authorization for the subscriber for at least one of roaming and the subscriber's valid subscription of the selected video channel.

5. The method of claim 1, further comprising:

allocating, by one or more of said IPTV service routers, bandwidth of one or more of the networks to the IPTV packets for prioritized transmission of the IPTV packets through one or more of said networks.

6. The method of claim 1, further comprising:

providing, by one or more of said IPTV service routers, at least one of network topology hiding and IPTV data security by protecting at least one of said generated IPTV packets and one or more of said networks against unauthorized access.

7. A network element for supporting the provision of an Internet protocol television service to a subscriber, wherein the network element is an IPTV service router configured to route IPTV packets, generated at an acquisition tier from video stream data of one or more video channels, from a network of a TV operator to one or more networks of one or more TV operators, for transmission of said generated IPTV packets to a FCC server cluster at a client-facing tier and delivery of IPTV packets associated with one of the one or more video channels selected by the subscriber from the deliver server cluster to a receiver of the subscriber at a client tier wherein the IPTV packets associated with the one of the one or more video channels selected by the subscriber are reassembled at said receiver into a coherent video stream for display to the subscriber, and that the network element is configured to signal and transport of generated IPTV packets through an intertwine tier arranged between the acquisition tier and the client-facing tier, whereby the network element is associated with one of the networks of the TV broadcaster and TV operators, the acquisition tier including the TV broadcaster and the client-facing tier including the one or more TV operators, the network element being further configured to engage in a roaming service of the subscriber from a network of a first TV operator to which the subscriber is originally subscribed to a roaming network of a second TV operator, determine data related to the roaming service, and charge the roaming subscriber for the roaming service on the basis of the determined data.

8. The network element of claim 7, wherein the network element is configured to send said generated IPTV packets from said associated network to one or more IPTV service routers of the intertwine tier associated with one or more networks of the one or more TV operators.

9. The network element of claim 7, wherein the network element is configured to receive said generated IPTV packets from a IPTV service router of the intertwine tier associated with the network of the TV broadcaster or from a IPTV service router of the intertwine tier associated with another one of the one or more networks of the one or more TV operators.

10. A method of providing an Internet protocol television service to a subscriber, the method comprising:

receiving IPTV packets from video stream data of one or more video channels generated at an acquisition tier;

routing the generated IPTV packets from a network of at least one TV broadcaster at the acquisition tier to a network of a first TV operator at a client-facing tier or from the network of the first TV operator at the client-facing tier to a network of a second TV operator at the acquisition tier by IPTV service routers installed at an intertwine tier arranged between the acquisition tier and the client-facing tier, each of the networks of the TV broadcaster and TV operators having an associated IPTV service router and the IPTV service routers signaling and transporting said generated IPTV packets through said intertwine tier;

receiving a request for roaming service from the subscriber roaming from the network of the first TV operator to which the subscriber is originally subscribed to a roaming network of the second TV operator; and triggering, if the subscriber is authorized for the roaming service, the IPTV service router associated with the network of the first TV operator to forward the IPTV packets to the IPTV service router associated with the roaming network of the second TV operator or triggering the IPTV service router associated with the network of the TV broadcaster to directly send the IPTV packets to the IPTV service router associated with the roaming network of the second TV operator, the authorization occurring at a roaming event, the roaming event occurring after the subscriber logs off the network of the first TV operator and the request for roaming service is received;

determining, by one or more of the IPTV service routers engaged in the roaming service, data related to the roaming service; and charging the roaming subscriber for the roaming service on the basis of the determined data.

\* \* \* \* \*